(12) United States Patent
Xie et al.

(10) Patent No.: US 10,754,831 B2
(45) Date of Patent: Aug. 25, 2020

(54) GENERATING A HIERARCHICAL DATA STRUCTURE

(71) Applicant: salesforce.com, inc., San Francisco, CA (US)

(72) Inventors: Xiaoyu Xie, Redwood City, CA (US); Roojuta Lalani, Fremont, CA (US); Rasik Phalak, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 344 days.

(21) Appl. No.: 15/496,894

(22) Filed: Apr. 25, 2017

(65) Prior Publication Data

US 2018/0307709 A1   Oct. 25, 2018

(51) Int. Cl.
| | | |
|---|---|---|
| *G06F 16/20* | (2019.01) | |
| *G06F 16/21* | (2019.01) | |
| *G06F 16/28* | (2019.01) | |
| *G06F 16/22* | (2019.01) | |

(52) U.S. Cl.
CPC ........ *G06F 16/211* (2019.01); *G06F 16/2246* (2019.01); *G06F 16/282* (2019.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

OTHER PUBLICATIONS

U.S. Appl. No. 13/986,251, filed Apr. 16, 2013.

*Primary Examiner* — Belix M Ortiz Ditren
(74) *Attorney, Agent, or Firm* — Dergosits & Noah LLP; Todd A. Noah

(57) ABSTRACT

A method and system for generating a hierarchical data structure is described. The hierarchical data structure is comprised of a plurality of nodes, wherein each node represents a record. The system monitors the generation of the hierarchical data structure to determine if the number of nodes in the hierarchical data structure exceeds a predetermined maximum number of nodes for the hierarchical data structure. The maximum number of nodes is independent of a width and a height of the hierarchical data structure. The system generates a notification in response to a determination that the number of nodes in the hierarchical data structure exceeds the maximum number of nodes.

21 Claims, 10 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,615,223 B1 | 9/2003 | Shih et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,762,362 B1 * | 6/2014 | Sathe ............... G06F 16/9027 707/706 |
| 8,898,204 B1 | 11/2014 | Sathe et al. |
| 10,158,709 B1 * | 12/2018 | Muniswamy-Reddy ............... H04L 67/1097 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0256893 A1 | 11/2005 | Perry |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0307336 A1 | 12/2009 | Hieb |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0127687 A1 | 5/2015 | Graves |
| 2015/0172563 A1 | 6/2015 | Jakobson et al. |

* cited by examiner

|    | Record Node ID | Root Node ID | Parent Node ID |
|----|----------------|--------------|----------------|
| 1  | A              | A            |                |
| 2  | B              | A            | A              |
| 3  | C              | A            | A              |
| 4  | D              | A            | A              |
| 5  | E              | A            | B              |
| 6  | F              | A            | B              |
| 7  | G              | A            | B              |
| 8  | H              | A            | C              |
| 9  | I              | A            | C              |
| 10 | J              | A            | D              |
| 11 | K              | A            | D              |
| 12 | L              | A            | D              |
| 13 | M              | A            | D              |
| 14 | N              | A            | E              |
| 15 | O              | A            | E              |
| 16 | P              | A            | G              |
| 17 | Q              | A            | K              |
| 18 | R              | A            | K              |
| 19 | S              | A            | K              |

FIG. 3

```
┌─────────────────────────────────────────────────────────────────┐
│  Determining an optimal number of records for a hierarchical data structure │  401
└─────────────────────────────────────────────────────────────────┘

┌─────────────────────────────────────────────────────────────────┐
│           Receiving a plurality of records from a client device           │  402
└─────────────────────────────────────────────────────────────────┘

┌─────────────────────────────────────────────────────────────────┐
│  Generating a hierarchical data structure comprising a plurality of nodes, each node │  403
│           representing one of the plurality of received records           │
└─────────────────────────────────────────────────────────────────┘

┌─────────────────────────────────────────────────────────────────┐
│  Determining if the number of nodes in the hierarchical data structure exceeds the │  404
│                       optimal record limit                       │
└─────────────────────────────────────────────────────────────────┘

┌─────────────────────────────────────────────────────────────────┐
│  Generating a notification when the number of nodes in the hierarchical data structure │  405
│                  exceeds the optimal record limit                  │
└─────────────────────────────────────────────────────────────────┘
```

FIG. 4

```
┌─────────────────────────────────────────────────────────────────────────┐
│ Receiving an update for a hierarchical data structure, the update       │  501
│ corresponding to a node in the hierarchical data structure              │
└─────────────────────────────────────────────────────────────────────────┘

┌─────────────────────────────────────────────────────────────────────────┐
│ Determining at least one other node in the hierarchical data structure  │  502
│ related to the node that corresponds to the update                      │
└─────────────────────────────────────────────────────────────────────────┘

┌─────────────────────────────────────────────────────────────────────────┐
│ Determining the number of nodes to be updated                           │  503
└─────────────────────────────────────────────────────────────────────────┘

┌─────────────────────────────────────────────────────────────────────────┐
│ Updating the hierarchical data structure synchronously when the number  │  504
│ of records to be updated is less than or equal to a threshold value     │
└─────────────────────────────────────────────────────────────────────────┘

┌─────────────────────────────────────────────────────────────────────────┐
│ Updating the hierarchical data structure asynchronously when the number │  505
│ of records to be updated is greater than the threshold value            │
└─────────────────────────────────────────────────────────────────────────┘
```

FIG. 5

GENERATING A HIERARCHICAL DATA STRUCTURE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or nodes, but otherwise reserves all copyright rights whatsoever.

TECHNICAL FIELD

The present disclosure relates generally to the creation and management of hierarchical data structures.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The following detailed description is made with reference to the technology disclosed. Preferred implementations are described to illustrate the technology disclosed, not to limit its scope, which is defined by the claims. Those of ordinary skill in the art will recognize a variety of equivalent variations on the description.

This invention relates to the field of data management, and in particular to a system and method that facilitates generation and management of a hierarchical data structure.

In order to manage large amounts of data, companies, organizations, entities and the like need to implement correspondingly large data infrastructures. Without the large data infrastructures, storing and querying massive amounts of data can be time consuming and expensive.

The large data infrastructures often store data logically in hierarchical data structures allowing mining or querying of the data in an efficient manner. For example, data associated with employees of a corporation may be organized first by department and then by roles of the employee within the department then by projects the employees are currently working on.

In hierarchical data structures, data is stored as a record and represented as nodes in the hierarchical data structure. Relationship links are provided to show the relationship between the different nodes, such as a parent-child relationship. Each node has one parent node or a predecessor node unless the node is a starting or initial root node. Each node, including the root node, can also have multiple child nodes.

Conventionally, in order to retrieve or query data in a hierarchical data structure, the whole data structure needs to be traversed starting from a root node. When the size and complexity of relationships between the nodes increase, traversing the relationships between the root node and the node containing the desired data result results in lengthy delays and/or excessive processing power of the computing resources.

Similarly, inserting or deleting nodes in a hierarchical data structure can also result in lengthy delays and/or excessive increases in processing power of the computer resources. In particular, updating nodes that depend on the inserted or deleted nodes may require traversing through all the nodes having a relationship with the inserted or deleted node and updating each of those nodes. For example, scheduling software might be used to manage project deadlines. When a single job or operation within the hierarchy is modified, delayed, or canceled, the estimated start and completion dates of all subsequent operations might need to be re-computed serially before the final completion date of the project can be made available. Since hierarchical data structures may include thousands of nodes, this approach can be both time-consuming and a less-than-optimal use of computing resources.

To prevent such disadvantages, the hierarchical data structure may have limits on the configuration of the nodes within the hierarchical data structure. For example, the nodes within hierarchical data structure may be represented in a tree form. The hierarchical tree structure provides a visual display of the relationships between the nodes, as depicted in FIG. 2. Limits may be placed on the height and the width of the tree. Based on performance tests executed on the hierarchical tree structure, an administrator may determine that operations, such as queries, performed on the data in the hierarchical tree structure perform seamlessly and optimally when a tree has a height of 20 nodes and a width of 20 nodes.

However, the rigid constraints of the height limitation and the width limitation of the hierarchical tree may not fit the needs of an organization. For example, an organization may determine need the height of the tree limit to be 20 nodes, but may need the width of the tree limit to be greater than 20 nodes.

What is needed is a system and method that provides flexible structural limits on the number of nodes in a hierarchical data structure.

BRIEF DESCRIPTION OF THE DRAWINGS

In the following drawings like reference numbers are used to refer to like elements. Although the following figures depict various examples, the one or more implementations are not limited to the examples depicted in the figures. Further, features illustrated in multiple figures are referenced by the same reference numerals.

FIG. 3 illustrates a flow chart of the process for generating a hierarchical tree representation based on defined node limits.

FIG. 4 illustrates a simple method of determining the number of nodes associated with a set of hierarchical data in a relational database table.

FIG. 5 shows another method of implementing hierarchical data in a relational database table.

DETAILED DESCRIPTION

Figure 1:
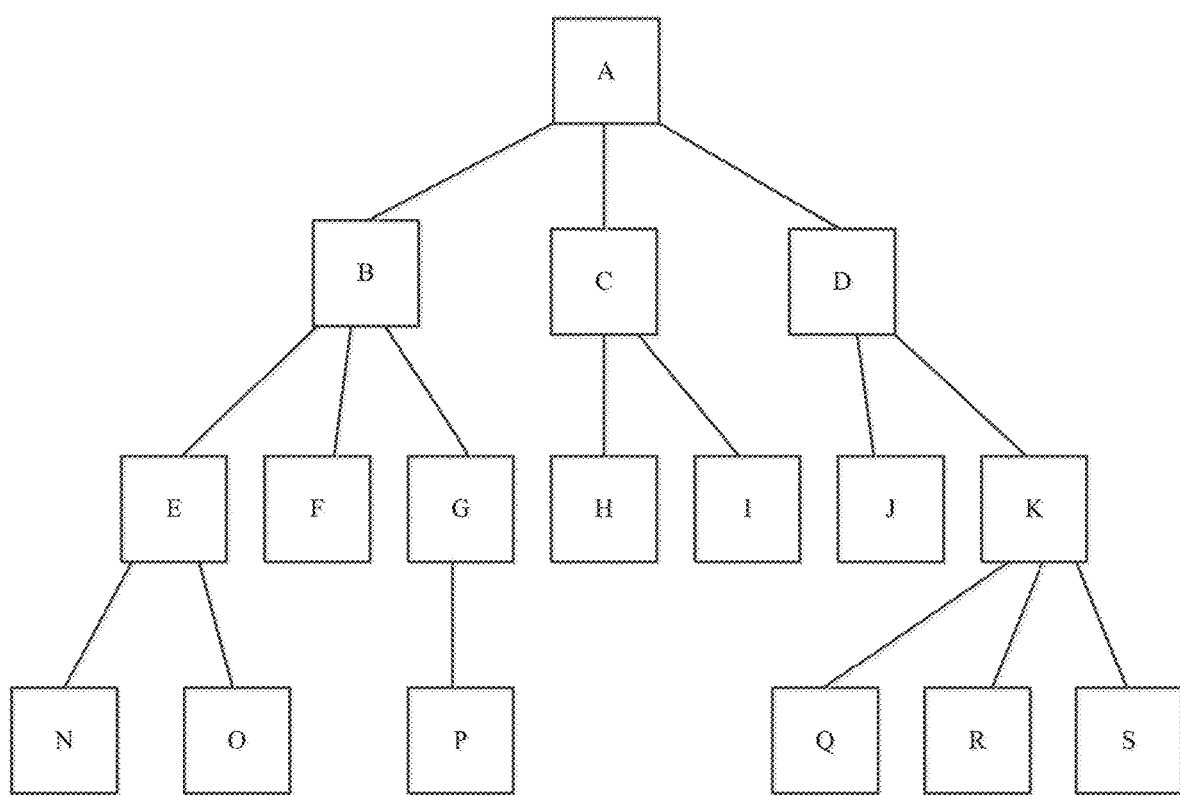
FIG. 1 illustrates a hierarchical tree, in accordance with some embodiments.

Systems and method are provided for generating and managing hierarchical data structures based on structural limits. The structural limits may dictate the maximum number of nodes in the hierarchical data structure and/or dictate in what manner the hierarchical data structure is updated.

Applications of the systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

In general, a multi-tenant database environment may include multiple databases configured to store data associated with organizations or customers. The data for the organization or the customer may be organized in a hierarchical fashion. By organizing data in a hierarchical fashion, analysis and/or operations can be performed efficiently. Although multi-tenant database environment is discussed, the system and method discussed can be implemented in a single tenant database environment.

Within the database, the data may be stored as nodes that are organized represented as nodes in a hierarchical data structure. In one embodiment, the hierarchical data structure may be a tree like structure. The nodes are connected to one another through links that represent the relationship between the nodes. The relationship between the nodes is a parent-child relationship.

FIG. 1 illustrates an example of a hierarchical tree structure.

A hierarchical tree structures provides a way of organizing data within a database. The data is stored as records and each record is represented as a node in the tree structure. For example, each node A-S in FIG. 1 represents a record in a database. In some instances, each node represents client data. In one embodiment, the hierarchical tree structure is of a file system wherein each node A-S represents a file, directory, or object, such as a document.

In a hierarchical tree representation, the root node is the very first or parent node. A root node is just like any node, in that it is part of a data structure, and represents a record which consists of one or more fields with links to other records and contains a data field; it simply happens to be the first node representing the first record. In FIG. 1, Node A is the root node for the hierarchical tree structure.

Besides the root node, each node within the tree has exactly one parent node or predecessor node. Additionally, each node, including the root node, may have multiple child nodes or successor nodes. An edge is a link from a parent node to a child node. For Example, Node B in FIG. 3 is the parent of Node E, Node F, and Node G; Node C is the parent of Node H and Node I; and Node D is the parent of Node J and Node K. Leaf nodes have no children. For example, Node N, Node P, Node Q and Node R does are leaf nodes because these nodes have no children.

The hierarchical tree structure depicted in FIG. 1 allows an organization or customer to traverse through the nodes in an organized and efficient manner using various operations and/or algorithms for querying data, mining data and the like. Properties of the hierarchical tree structure are often used to define the structure and define the operations/algorithms used on the hierarchical tree structure. For example, when generating a tree, the size of the tree may be limited based on properties (height of a tree or width of a tree) defined by an administrator. In another example, properties of a tree may dictate which query algorithm is used.

Figure 2:
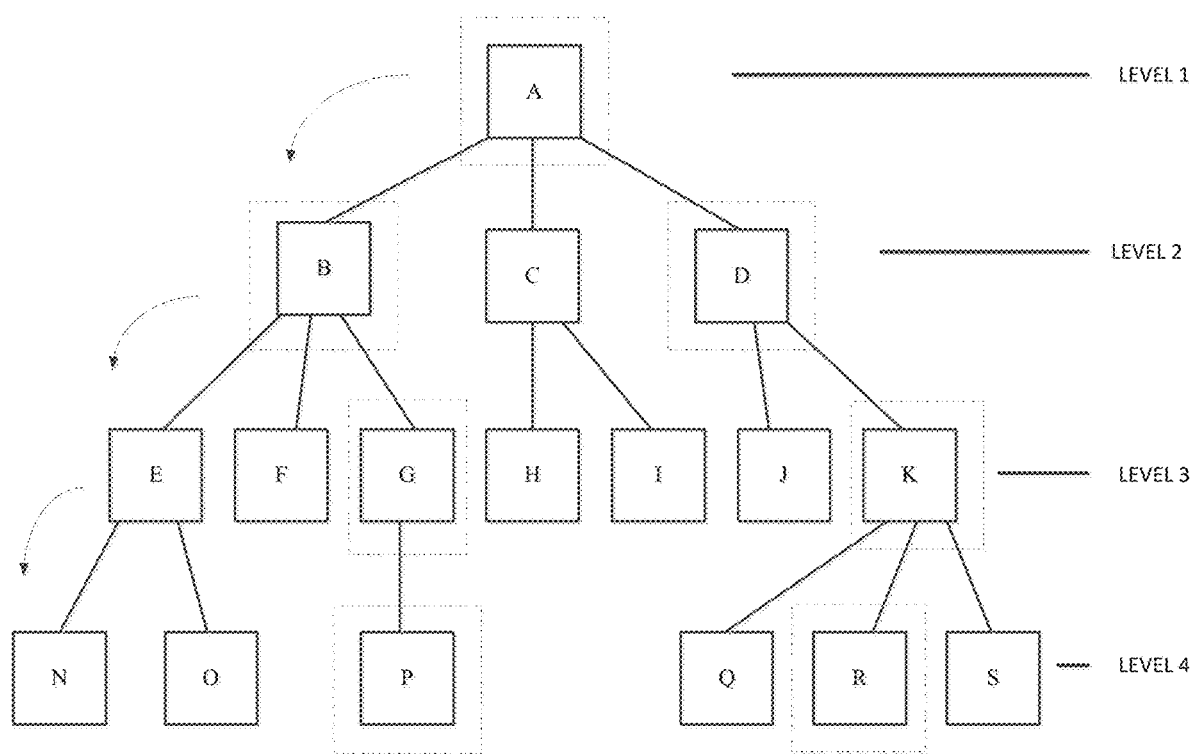
FIG. 2 illustrates a hierarchical tree with the height, width and levels of the tree displayed, in accordance with some embodiments.

FIG. 2 illustrates the properties of the hierarchical tree structure depicted in FIG. 3.

Properties of a hierarchical tree structure may be represented by the number of levels in a tree, the height of a tree and width of a tree.

The number of levels within a tree is determined by determining the level of each node and identifying the node with the highest defined level. The level of a node may be defined by 1+the number of connections between the node and the root. For example, the level of Root Node A is 1 (1+0 connections between the node and the root. The level of Nodes B, C, and D is 2 (1+1 connection between the nodes and the root). The level of Nodes E, F, G, H, I, J, and K is 3 (1+2 connections between the nodes and the root). And, the level of Nodes N, O, P, Q, and R is 4 (1+3 connections between the nodes and the root). Nodes N, O, P, Q and R have the highest defined level (level 4). Therefore, the number of levels within the tree is 4.

The height of a hierarchical tree structure is determined by determining the height of the root node of the tree. The height of the root node is the number of links (also referred to as relationships or edges) on the longest downward path between a node and a leaf node. In FIG. 2, the number of links on the longest path downwards between root Node A and any of the leaf Nodes N, O, P, Q, and R is 3 links. The arrows in FIG. 2 indicate the links for path 1 A-B-E-N which is one of the five paths from root Node A to leaf Node N. The other four paths include: path 2 A-B-E-O; path 3 A-B-G-P; path 4 A-D-K-Q; and path 5 A-D-K-R. All five paths have the same number of links, 3 links. Therefore, the height of the tree is 3.

The width of a hierarchical tree representation is the number of nodes on the longest path between two leaves in the tree. The number of nodes on the longest path in tree structure in FIG. 2 is 7. In one example, Nodes P, G, B, A, D, K, and R (highlighted in FIG. 2) represent one of the five longest paths between two leaf nodes within the tree. The number of nodes on each of the other four paths is also 7 nodes.

FIG. 3 illustrates a hierarchical table representation of the hierarchical tree structure depicted in FIG. 1.

The table may consist of at least three columns, a column that stores a Node ID, a column that stores the Root Node ID and a column stores the Parent Node ID. The Node ID stores the name or identification of each of the nodes depicted in the tree structure in FIG. 1. For each of the nodes the Root Node ID and Parent Node ID is identified and listed in the respective columns. The table may comprise other columns not depicted in FIG. 3. For example, the table may include a column for children Node ID, level ID and the like.

In one embodiment, the table may be a relational table wherein each row represents a record that is represented as a node in the hierarchal tree. The client data associated with the record may be stored within the table. Links from one of the record to another record may be included in the table.

The first row of the table represents Root Node A. Since Node A is a root node, the Root Node ID would be the same as the Node ID. Additionally, since a root node does not have any parents, the Parent Node ID would be null. The parent Node ID will always be the same as the Root Node ID for the highest hierarchical data element, the root node.

The second row, third row, and fourth row of the table depicts Nodes B, C and D having the same parent, Node A. In other words, the table displays that Node A has 3 children, namely, Node B, Node C and Node D. Thus, the Root Node ID for each of Node B, Node C and Node D equals A (representing Node A).

Node E, Node F and Node G are children of parent Node B. Node B is the child of parent Node A. In other words, Node A is a grand-parent of Nodes E, F and G. Therefore, in rows five, six and seven for respective Node E, Node F and Node G, the table lists Node B (the parent node) as the Parent Node ID. In some embodiments, the Parent Node ID column will only include the direct parent of the node. For example, the Parent Node ID for Node E would only include Node B as Node B is the direct parent. In some embodiments, the Parent Node ID column will include a lineage of parents, such as a grand-parent Node or a great-grand-parent Node. For example, for Node E, Node B is the parent and Node A is the grand-parent node and both Node B and Node A may be listed in the Parent Node ID column. Node E, Node F and Node G all have the same root node, Node A. Therefore, the Root Node ID for Node E, Node F and Node G is the Root Node ID for Node A.

Rows eight to nineteen are similarly represent Nodes H-S represented in FIG. 1.

The hierarchical table shown in FIG. 3 provides enough information to retrieve all possible hierarchical relationships among the nodes and identify the number of nodes within the hierarchical data structure. The hierarchal table may be used to determine the relationships between the nodes. For example, the table can be queried, searched or traversed to determine which nodes depend from Node G of FIG. 2.

Hierarchical data structures such as those depicted in FIGS. 1-3 have been a common data storage choice for different entities such as corporations, enterprises, business and the like. Using the hierarchical data structures, entities are able to organize and manage large amounts of data efficiently. For example, entities are able to quickly sift through volumes of data, perform complex queries, and mine data more accurately. However, as the complexity of the relationships between the data and the amount of data increases, the stress on computer resources performing the sifting, querying and mining operations increases. If the stress on computer resources becomes too great, the computer resources may crash or the operations may time out because the operation is taking too long to complete. In other words, if the volume, velocity and variety of records represented as nodes in the hierarchical data structure is too great, the hierarchical data structure often cannot deliver the performance and latency required to handle large, complex operations.

To prevent such catastrophes, entities may limit the number of nodes in the hierarchical data structures. Hierarchical data structures, such as trees, may have limits on the height and the width of the tree. As discussed above the height of a tree may be the number of links in the longest downward path from a root node and the width of the tree may be the number of nodes in the longest path from any two leaf nodes. For example, an administrator may restrict hierarchical tree structure to a height of 20 links and width of 20 nodes. However, such rigidness in height and width limits is undesirable. For example, a client may not need a tree to have a height of 20 links but may need the tree to have a width greater than 20 nodes. A more flexible and desirable alternative is to have limits on the number of nodes that may be incorporated in a hierarchical tree, not a limit on the height and width of the tree.

To determine an optimal limit number of nodes that may be incorporated into a hierarchical data structure, a series of performance tests are performed on the hierarchical data structure. Based on the results of the performance tests, a determination can be made as to the optimal number of nodes a hierarchical data structure may include so that performance and latency expectations met.

Simulation studies on real-time database systems that store data in a hierarchical data structure are performed to determine certain performance metrics. The simulation studies use a variety of different algorithms for traversing through the hierarchical data structure. For example, different query designs may be used to test the hierarchical data structure. Performance metrics such as an average response time and throughput, fault tolerance, scalability, mean-time to failure, mean time to repair, and the like are recorded. Based on the performance metrics, an optimal number of nodes may be determined. For example, calculations may determine the number of nodes that can be accessed within a certain amount of time based on the average response time performance metric.

In another embodiment, a series of tests may be performed on hierarchical structures having different number of nodes. Based on the performance test result, the hierarchical structure having the best performance test metrics will be selected as being optimal number of nodes for the hierarchical data structure. The optimal number of nodes or the node limit can then be used to limit the size of a hierarchical data structure that is being generated.

FIG. 4 illustrates a flow chart for generating a hierarchical data structure based on a node limit.

In step 401, an optimal number of nodes, or an optimal node limit, for a hierarchical data structure is determined. As described above, the optimal number of nodes for a hierarchical data structure is based on performance tests. In one embodiment, the optimal number of nodes is a limit that is set by an administrator and is not based on the performance test.

In step 402, a plurality of records are received from a client device. The records may include at least one attribute that defining a relationship with the other records. For example, a client may provide a list of employees for a company. The list of employees may include employees Jack, Jill and Fred. For each employee, the client may specify their role within company which defines the relations between other employees on the list. For instance, the client may include in the list that Jack is the CEO of the company, Jill is the sales manager of the company, and Fred is salesman.

Each record received by the client represents a node in the hierarchical data structure to be generated In step 403, a hierarchical data structure comprising a plurality of nodes is generated. Each of the nodes represents a record received from the client device.

In step 404, a determination is made as to whether the number of nodes in the hierarchical data structure exceeds the optimal node limit.

In one embodiment, after a client enters a first record, a hierarchical data structure is generated. The first record is represented in the hierarchical data structure as a first node. A running count of the number of nodes within the hierarchical data structure is maintained as more records are received by the client. For example, once a second record is received from the client, hierarchical data structure is updated to include a second node. A running count of the number of nodes within the hierarchical data structure increase to 2 nodes after the hierarchical data structure was updated. Each time the hierarchical data structure is updated with a new node, a determination may be made as to whether the number of nodes in the hierarchical data structure exceeds the optimal record limit each time a data entry is received by a client.

In another embodiment, the number of nodes added to the hierarchical data structure is determined when all the records are received from the client. For example, once the client has completed entering in all the records, the client may select an option to generate or save the records in the hierarchical data structure. At that time, the number of nodes that will represent each of the records is calculated and a determination is made as to whether the calculated number nodes exceed the optimal node limit.

In step 405, a notification is generated when the number of nodes in the hierarchical data structure exceeds the optimal node limit. In one embodiment, the notification is an error message. The message may be an e-mail, text message, SMS message, a pop-up notification, and the like.

In another embodiment, the notification is a warning message sent to the client and/or an administrator. For example, when the number of nodes in the hierarchical data structure exceeds the selected optimal node limit, the client may be able to save the node within the hierarchical data structure; however, operations, such as a query operation or a data mining operation, may be suspended until the hierarchical data structure is reformatted to conform with the optimal node limit. For example, a client's request to query the hierarchical data structure may be denied. In such an instance, warning message may be sent to the client or administrator indicating that operations may not be performed on the hierarchical data structure until the hierarchical data structure is reformatted.

If the client or administrator receives the notification, the client or administrator may increase the optimal node limit. In some instances, the client or administrator may have to authorize payment or provide payment for the increase.

For example, the notification may include a link that allows an administrator or client to increase the optimal node limit. In some instances, the link may be hyperlink to an account portal that allows the client or administrator to log-in to a database providers site and provide authorization or payment for increasing the optimal node limit. In some instances, the notification may a selectable widget that would provide automatic authorization to increase the optimal node limit.

In one embodiment, when records are received by a client, a hierarchical data structure may not immediately be generated. For example, based on the number of records received by a client, a determination can be made as to how many nodes will be included in the hierarchical data structure representing the received records. Based on this determination, a notification will be generated denying the generation of the hierarchical data structure if the number of nodes that will be included in the hierarchical data structure will exceed the optimal node limit.

Once the hierarchical data structure is generated, an administrator or client may want to update the data represented within the structure. Updating the data within a hierarchical data structure can become cumbersome based on the size and complexity of the hierarchical data structure. As the number of nodes stored in the hierarchical data structure increases, the complexity of the relationships between the nodes increases. As the complexity of the relationships between the nodes increases, the time to update the nodes within the hierarchical data structure and the utilization of computer resources used to update the hierarchical data structure increases.

For example, scheduling software might be used to manage project deadlines. When a single job or operation within the hierarchy is modified, delayed, or canceled, the estimated start and completion dates of all subsequent operations might need to be re-computed serially before the final completion date of the project can be made available. Similarly, should the cost of any individual sub-assembly of a larger manufactured item change, the cost of an entire item that includes that sub-assembly might need to be re-calculated by traversing the entire hierarchical data structure and re-computing all costs in the structure to account for the changed cost of the sub-assembly. Since hierarchical data structures may include thousands of nodes, updating a tree can be both time-consuming and a less-than-optimal use of computing resources.

A more efficient way of performing updates in the hierarchical data structure is to perform the updates synchronously in some instances and perform updates asynchronously in other instances.

In one embodiment, the performance of synchronous updates or asynchronous updates may be based on the size of the hierarchical data structure. If the number of nodes in the hierarchical data structure is less than or equal to a threshold value, then updates to the hierarchical data structure would be done synchronously. If the number of nodes in the hierarchical data structure is greater than a threshold value, then the updates to the hierarchical data structure would be done asynchronously. The threshold value may be the optimal node value or another value determined by an administrator.

For example, if a client wants to update records associated with the nodes in a hierarchical tree structure, the number of nodes within the hierarchical tree structure is determined. If the number of nodes within the hierarchical tree structure is less than the optimal node value, then the update is performed synchronously. If the number of nodes within the hierarchical tree structure is greater than or equal to the optimal node value, then the update is performed asynchronously. In one embodiment, a notification may be generated if the hierarchical tree structure is going to be updated asynchronously.

In another embodiment, updates may be performed synchronously on some of the nodes that need to be updated and asynchronously on other nodes that need to be updated. For example, a system may determine the number of nodes that need updating. If the number of nodes to be updated is less than or equal to a threshold value, then nodes may be synchronously updated. On the other hand, if the number of nodes is greater than a threshold value, then the nodes are updated asynchronous. Providing synchronous update operations and asynchronous update operations allows for a more efficient update process.

FIG. 5 illustrates a flow chart of the process for updating a hierarchical data structure based on defined node limits.

At step 501, updates for a hierarchical data structure are received by a client device, where each updates correspond to a node in the hierarchical data structure. The updates may be for a first set of nodes, wherein a set of nodes is one node or more. Updates may include, adding a node, deleting a node, amending the data within a node, re-parenting of a node or changing relationships between the node and other nodes. In one embodiment, the client may submit the updates to the nodes by changing the records that represent the nodes in the hierarchical data structure.

At step 502, at least one other node related to the node to be updated is identified. The at least one other node would also have to be updated based on its relation to the node to be updated. For example, once a client submits updates for Node A, as depicted in FIG. 1, Node B is identified because Node B is related to Node A. Node B is a child of Node A and comprises data that would be affected by the update to Node A.

In one embodiment, other nodes are identified merely by the relationship link between the node to be updated and the other nodes. The relationship links may be determined from querying a table as depicted in FIG. 3 or traversing a hierarchical structure as depicted in FIG. 2. In another embodiment, once the other nodes are identified by the relationship link to the node to be updated, the data associated with the other identified nodes is analyzed to determine if the data in the other identified nodes is dependent on data associated with node that needs to be updated. For example, once Node B is identified, the data associated with Node B is analyzed to see if the data is dependent on the data associated with Node A.

At step 503, the number of nodes that need to be updated is determined. For example, Node A has one child node, Node B, and Node B that contains data that is dependent on the data in Node A. Therefore, the number of nodes to be updated would be 2 nodes (Node A+Node B). The number of nodes that need to be updated is determined by the number of nodes that correspond to the received updates and the number of other nodes that have been identified as needing to be updated based on the nodes that correspond to the received update.

At step 504, a synchronous update of the hierarchical data structure is performed when the number of nodes to be updated is less than or equal to a threshold value. Synchronous update of the hierarchical data structure includes updating the hierarchical data structure in real-time. For example, the nodes that need updating are updated before another operation is performed on the hierarchical data structure.

For instance, the threshold value of 3 nodes may have been determined based on performance tests. Since the number of nodes to be updated is 2 nodes (Node A+Node B) as determined in step 503, and 2 nodes is less than 3 nodes, the hierarchical data structure is synchronously updated. If too many nodes are indicated as needing updating, the stress on computer resources and the time it takes to process all the updates may be too great. For example, processing 10,000 record updates in a synchronous fashion may cause the database storing the nodes to crash or the operation may time out because completion time of the operation is too long. By limiting the number of synchronous updates to a threshold value, database crashes and time-out operations may be avoided.

In one embodiment, the threshold value is the nodes limit that specifies the optimal number of nodes of the hierarchical data structure, as described above in FIG. 4. In another embodiment, the threshold value is a number of nodes that are predefined by the administrator. The administrator may assign a threshold value based on performance tests indicating an optimal number of nodes that can be synchronously updated.

For example, a threshold value for the number of nodes that may be synchronously updated is set at 3 nodes. The threshold value was determined based on performance tests of the computer resources that would be performing the updates to the hierarchical data structure. Performance tests of the hierarchical structure may also be performed. For example, performance testing indicating the time it takes to update the hierarchical structure or the amount of processing power it takes to update the hierarchical structure may be the basis of determining the threshold value as the number of nodes that are updated is directly related to the update time and processing power. Processing power of computer resources performing update operations may be determined by testing synchronous updates of a various number of nodes to determine a balance of processing power and the number of nodes. Based on the number of nodes that would be able to be processed synchronously with optimal processing power by the resources, an optimal number of nodes would be determined to be the threshold value for synchronously updating nodes in the hierarchical structure.

At step 505, an asynchronous update of the hierarchical tree is performed when the number of nodes to be updated is greater than the threshold value. An asynchronous update may include assigning the update operation to a queue wherein the update operation will eventually be processed. The updates are then triggered by an internally scheduled job which then actually updates the data in the database. In one embodiment, the asynchronous update occurs when the process is offline or when the server storing hierarchical data structure is not so busy.

In one embodiment, if the number of nodes to be updated is greater than the threshold value, then updates for nodes up to threshold value may be processed. The remaining updates may be queued for an asynchronous update. For example, if a threshold value is determined to be 30 nodes and the number of nodes that need updating is 70 nodes, the first 30 nodes would be updated synchronously and the remaining 40 nodes (70 nodes needing updating—30 nodes being updated synchronously) would be updated asynchronously.

Additionally, in some instances, the nodes that need updating may be prioritized or ordered. For example, an administrator may determine that nodes that need updating are ordered based on their relational distance from the root node, where nodes that have the shortest relational distance to the root node are updated before nodes having a longer relational distance from the root node. In another instance, the administrator may specify that updates may of child nodes occur before updates of parent nodes.

Figure 6:
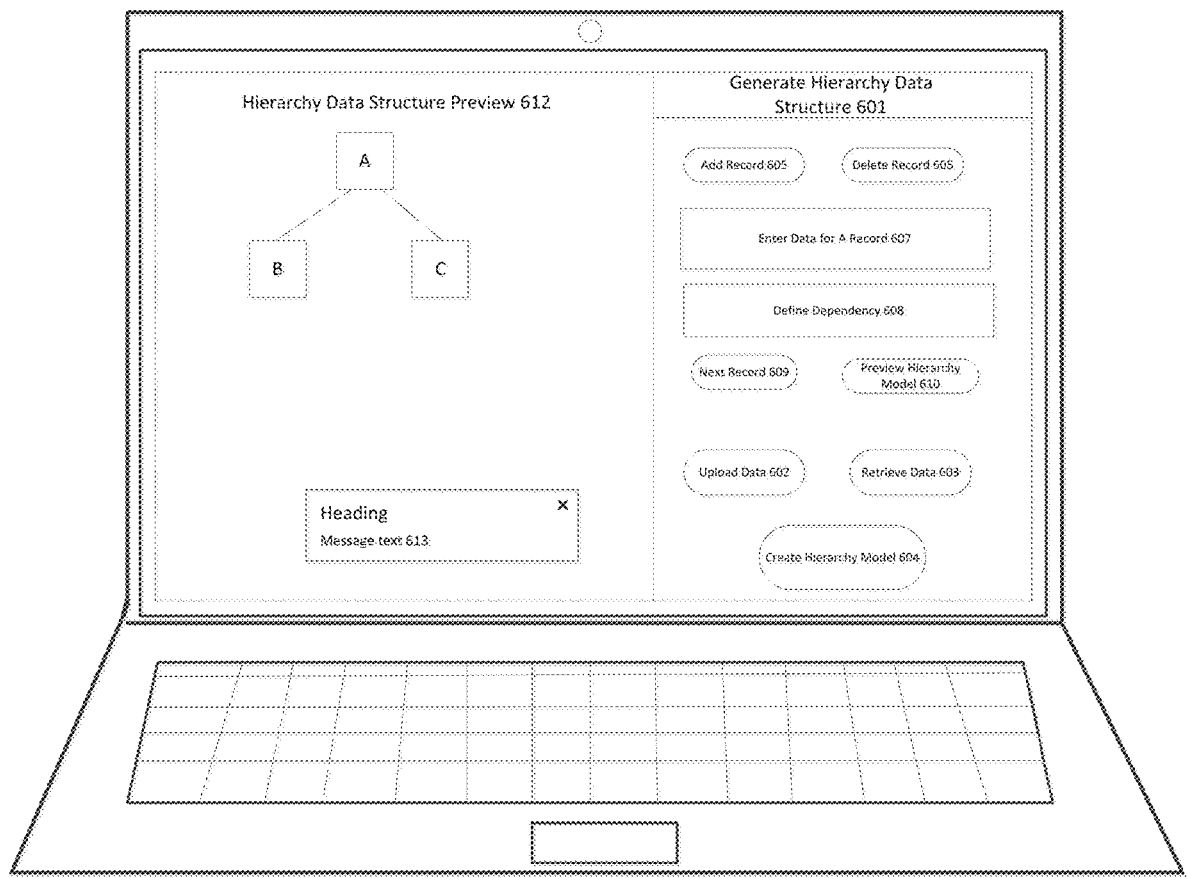
FIG. 6 shows another method of implementing hierarchical data in a relational database table.

FIG. 6 illustrates a user interface that may be used to create a hierarchical data structure.

In one embodiment, to generate a hierarchical data structure, a client may enter relational data entries in a spreadsheet, such as in Microsoft Excel. The client may indicate relationships between the data entered within the spreadsheet. For example, each leaf record may be represented in a single row of a spreadsheet. For each row may include a complete traversal from the leaf record to the root record. In another example, each record within the spreadsheet may include a relational link to another record in the spreadsheet.

Once the client has generated the spreadsheet, the spreadsheet can be uploaded by selecting button 602 on the graphical user interface. Once the spreadsheet has been uploaded, the data entries may be extracted and transformed into the hierarchical data structure. A preview of the hierarchical data structure may be generated automatically. In another embodiment, the client may select the preview button 610 to generate the preview.

In another embodiment, to generate a hierarchical data structure, a client may indicate where to find data and the data may be automatically retrieved and organized in a table or a tree format. If a client selects the retrieve data button 603, the client may be requested to enter in a link, website, directory or the like where the data is stored. For example, contact data for contacts on in a contact list may be retrieved. The contact data may be automatically organized in a relational table so that relationships between the contacts are indicated in the table. In one instance, the contact list may be a corporate employee list that includes the department each employee work for and the role of the employee within the department. A client may enter a link to where the contact list is stored. The contact list may then be retrieved. A preview of the hierarchical data structure of the contact list may be generated. To generate the hierarchical data structure, the employees may be entered into a table, wherein each employee contains a relational link to at least one other employee. The table may be displayed to a client automatically or if the client selects the preview button 610. The result is a hierarchical representation of the employees within the corporation. In another instance, contacts from social media sites may be collected, mined or retrieved. Based on the data of the contacts on the social media sight, a hierarchical representation of the contacts may be generated in a table or spreadsheet, wherein the each record for each contact includes relational links to at least one other record.

In yet another embodiment, to generate a hierarchical data structure, may enter data directly in the user interface. The client may select the add record button 605. Once the client selects the add record button 605, the client may enter data associated with the record in box 607. In some instances, the client may define the relationship with at least one other record in box 608. The client may then enter data for another record to be stored in the hierarchy data structure by selecting the next record button 609. At any time while entering data for multiple records, the client may select the preview hierarchy button 610. In some instances, a preview of the hierarchical data structure is automatically displayed to the client in 612.

As the client enters data for each record, a counter is used to keep track of the number of records. If the number of records exceeds a predefined record limit, a notification is displayed to the client in 613.

Once the data has been uploaded, entered or retrieved, the client may select the create hierarchy model. When the client selects the create hierarchy model, the data is permanently stored and the client may perform operations, such as queries or mining, on the data.

Figure 7:
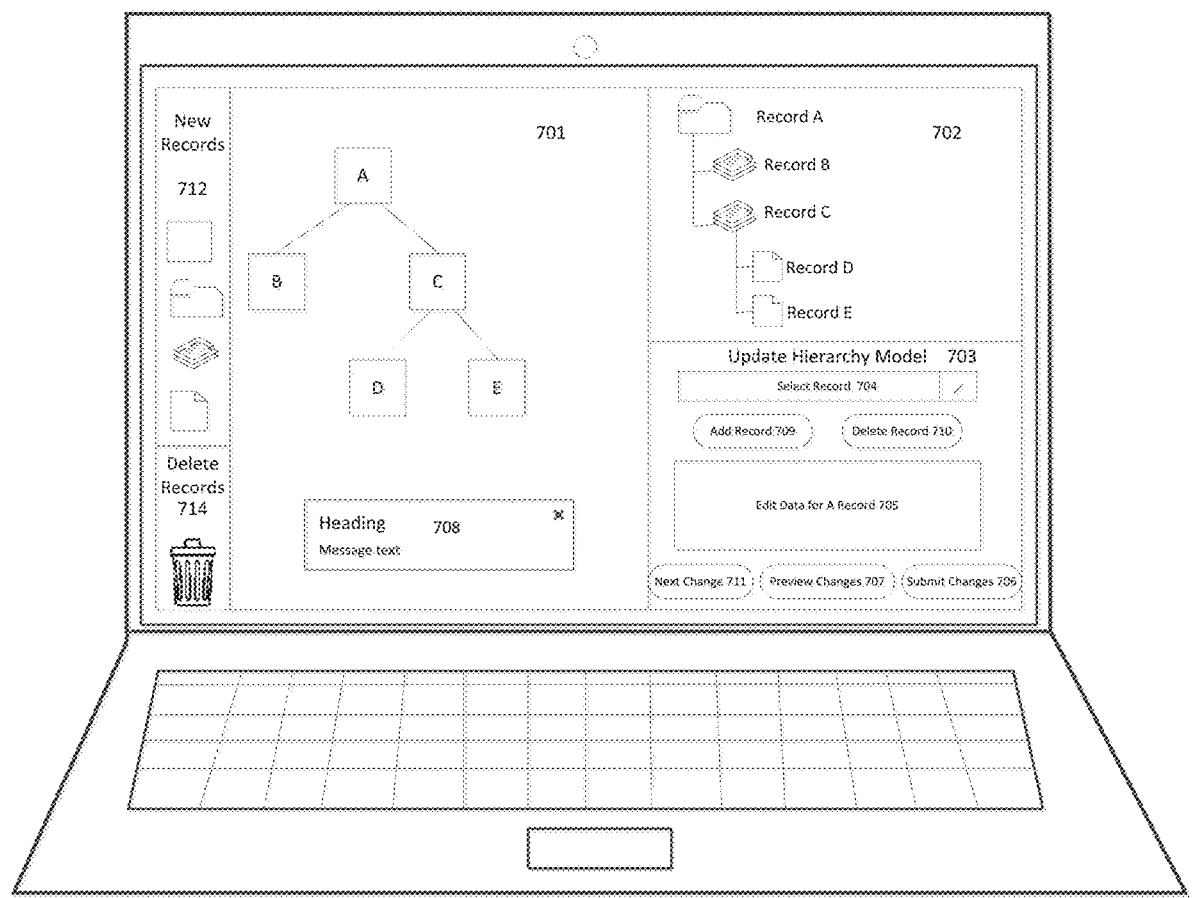
FIG. 7 illustrates a flow chart of the process for updating a hierarchical tree representation based on defined node limits.

FIG. 7 illustrates a user interface that may be used to update a hierarchical data structure.

A graphical user interface may depict the data that is organized in table or spreadsheet in a hierarchical tree representation 701 and/or may also display a directory tree structure 702 representation of the data. The directory tree structure 702 displays the hierarchy of the data. For example, Record C has 2 children, Record D and E. Record B and Record C have the same parent Record A. Although the graphical user interface in FIG. 7 displays both the directory tree structure 702 and the hierarchical tree structure 701, a client or administrator may choose to display only one of the hierarchical tree structure 701 or the directory tree structure 702.

In one embodiment, the client may generate a hierarchical tree structure or a directory tree structure within the graphical user interface instead of entering data into a table and then having a computer application convert the data entered in the table into a hierarchical tree structure 701 or directory tree structure 702 that is displayed for the client. For example, within the user interface, a client may choose to create a hierarchy layout. The hierarchy layout may be a hierarchical tree structure or a directory tree structure. A client may then enter data for a root record in the hierarchy layout. Thereafter, the client may insert records into the hierarchy layout and provide links from the inserted records to other records within the hierarchy layout. Essentially, the client is generating the hierarchical tree structure or directory tree structure within the user interface.

Once the hierarchical tree structure 701 or the directory tree structure 702 is generated and displayed to a client, the client may update the hierarchical tree structure 701 or the directory tree structure 702. In one embodiment, the client may select a record that needs updating from the drop down box 704. In another embodiment, the client may select a record that needs updating by selecting the record that needs updating in the hierarchical tree structure 701 or the directory tree structure 702. For example, a client may click on record A in the tree structure 701 or record A in the directory tree structure, if the client wants to update record A.

When the record that needs updating is selected, data currently included in the record may be displayed to the client in 705. Once the data is displayed, the client may be able to edit the data to reflect the updating information. In one embodiment, the data currently included in the selected record is not displayed to the client. However, the client may enter new data into box 705, wherein the entered data will replace the data already stored in the selected record.

The client may also be able to add a new record or delete a record to the existing. In one embodiment the client may select a button to add a record or delete a record. A pop up box similar to box 708 may be displayed on the user interface in response to the add record box or delete record box being selected.

If a record is being added, the pop up box may require the client to select or input the records that will be related the new added record. For example, a client may want to add record F to the hierarchy structure. Once the client selects the Add record button, the client may be prompted to enter a name for the record and enter data associated with the record. The use may also be prompted to provide the parent record that will be associated with record F and any children that will depend on record F. In this example, the client may specify that Record B will be the parent record of Record F and that record F does not have any dependent child records.

If the client is deleting a record, the pop up box may include a warning of the other records within the tree or directory tree structure that will be affected by the deletion of the record. The client may also be provided a warning to update any of the records that will be affected by the deletion of the record.

In another embodiment, records may be added to the hierarchical tree structure and/or the directory tree structure by dragging and dropping representations 712 of records into the hierarchical tree structure and/or the directory tree structure. Once a client adds the new record representation to into the hierarchical tree structure or directory tree structure, the client may be able to input data into box 705 that should be associated with the newly added record.

In another embodiment, records may be deleted by dragging the record from the tree structure or the directory tree structure and dropping the record into the trash can 714. A message may be displayed to the client so that the client may confirm the deletion of the record from the tree structure or directory tree structure.

Changes to the tree structure or the directory tree structure may not be reflected in the underlying data storage or database. In other words, a client may make a plurality of changes to different records within the hierarchical structure rather than submitting one change at a time. Each time a client updates a record in the hierarchical structure, the client may select the next change button 711 if the client wants to make more updates to different records. Once the client has completed entering in all updates to the hierarchy structure, the client may preview the changes by selecting the preview change button 707. An updated tree structure or directory tree structure will be displayed to the client.

To make the updates permanent and to have the changes reflected in the database storing the hierarchical data, the client will select the submit changes button 707. Based on the number of records that were updated by the client and the number of records that need dependent updates based on the records that were updated, the updates may be processed by the database synchronously or asynchronously. As described in greater detail above, if the total number of records that need to be updated is less than or equal to a predefined threshold value, then the update of records is performed synchronously. If the total number of records that need to be updated is more than the predefined threshold value, the records up to the predefined threshold value are updated synchronously and the remaining records are update asynchronously.

Figure 8A:
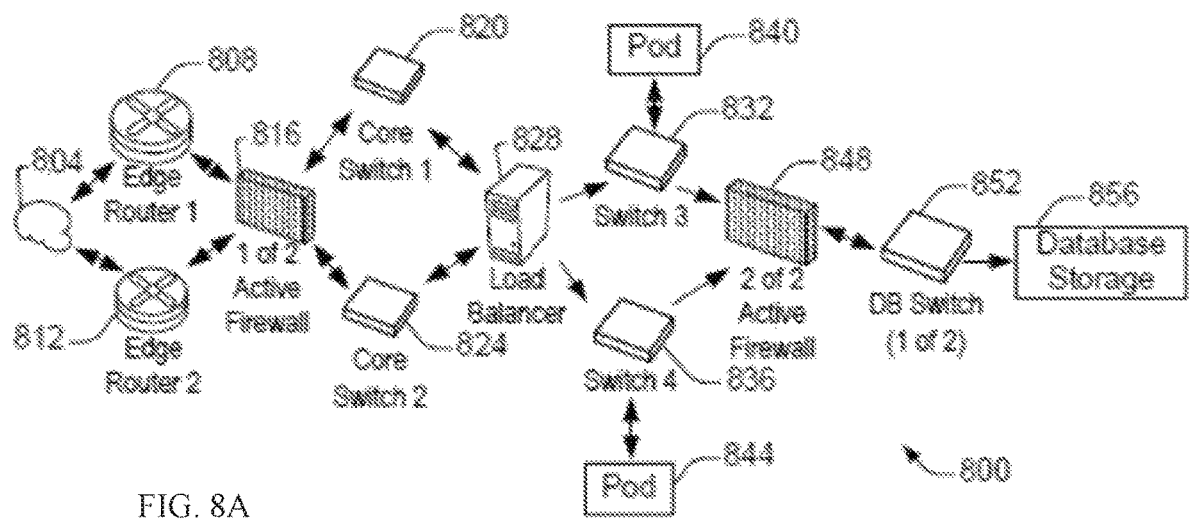
FIG. 8A shows a system diagram illustrating architectural components of an applicable environment, in accordance with some embodiments.
Figure 8B:
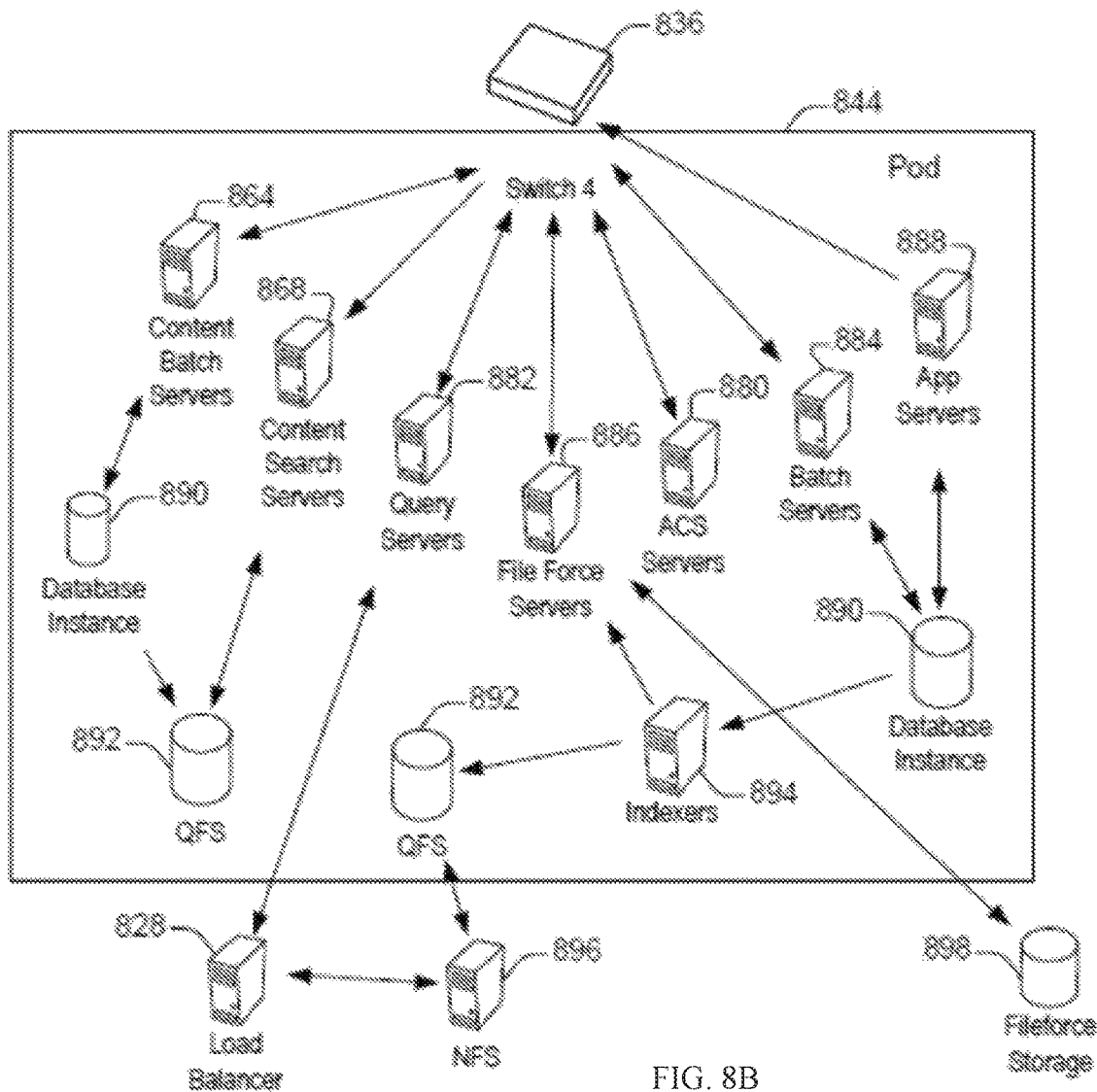
FIG. 8B shows a system diagram further illustrating architectural components of an applicable environment, in accordance with some embodiments.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some embodiments of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some embodiments, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more embodiments, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some embodiments, the core switches 820 and 824 are high-capacity switches that transfer packets within the on-demand service environment 800. The core switches 820 and 824 may be configured as network bridges that quickly route data between different components within the on-demand service environment. In some embodiments, the use of two or more core switches 820 and 824 may provide redundancy and/or reduced latency.

In some embodiments, the pods 840 and 844 may perform the core data processing and service functions provided by the on-demand service environment. Each pod may include various types of hardware and/or software computing resources. An example of the pod architecture is discussed in greater detail with reference to FIG. 8B.

In some embodiments, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some embodiments, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some embodiments, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some embodiments, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some embodiments, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one embodiment. The pod 844 may be used to render services to a user of the on-demand service environment 800. In some embodiments, each pod may include a variety of servers and/or other systems. The pod 844 includes one or more content batch servers 864, content search servers 868, query servers 872, file force servers 876, access control system (ACS) servers 880, batch servers 884, and app servers 888. Also, the pod 844 includes database instances 890, quick file systems (QFS) 892, and indexers 894. In one or more embodiments, some or all communication between the servers in the pod 844 may be transmitted via the switch 836.

In some embodiments, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 876 may manage requests information stored in the Fileforce storage 878. The Fileforce storage 878 may store information such as documents, images, and basic large objects (BLOBs). By managing requests for information using the Fileforce servers 876, the image footprint on the database may be reduced.

The query servers 872 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some embodiments, the ACS servers 880 may control access to data, hardware resources, or software resources.

In some embodiments, the batch servers 884 may process batch jobs, which are used to run tasks at specified times. Thus, the batch servers 884 may transmit instructions to other servers, such as the app servers 888, to trigger the batch jobs. For some embodiments, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some embodiments, one or more query servers 872 may communicate with the NFS 896 to retrieve and/or update information stored outside of the pod 844. The NFS 896 may allow servers located in the pod 844 to access information to access files over a network in a manner similar to how local storage is accessed. In some embodiments, queries from the query servers 822 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some embodiments, the pod may include one or more database instances 890. The database instance 890 may transmit information to the QFS 892. When information is transmitted to the QFS, it may be available for use by servers within the pod 844 without requiring an additional database call. In some embodiments, database information may be transmitted to the indexer 894. Indexer 894 may provide an index of information available in the database 890 and/or QFS 892. The index information may be provided to file force servers 876 and/or the QFS 892.

Figure 9:
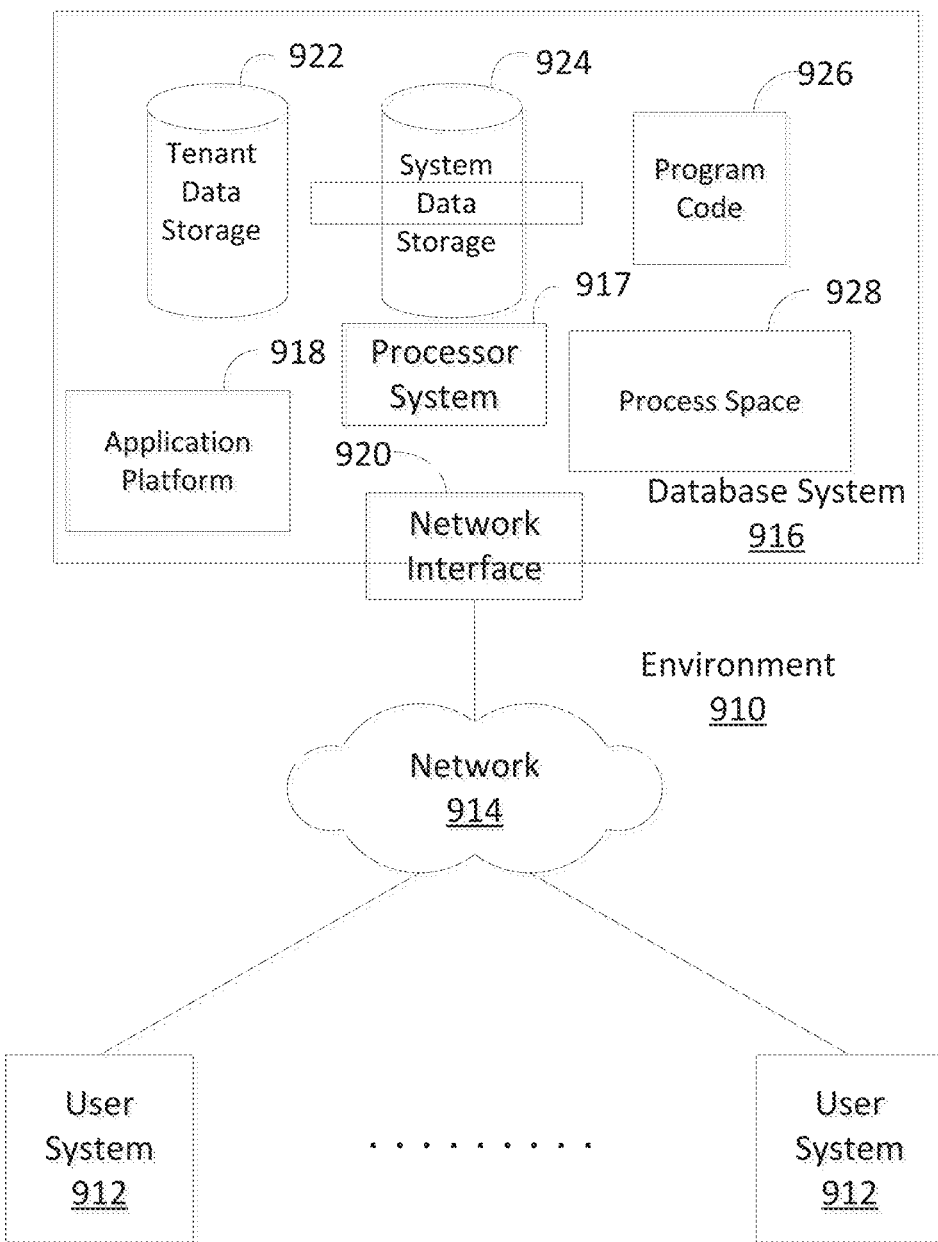
FIG. 9 shows a system diagram illustrating the architecture of a multi-tenant database environment, in accordance with some embodiments.
Figure 10:
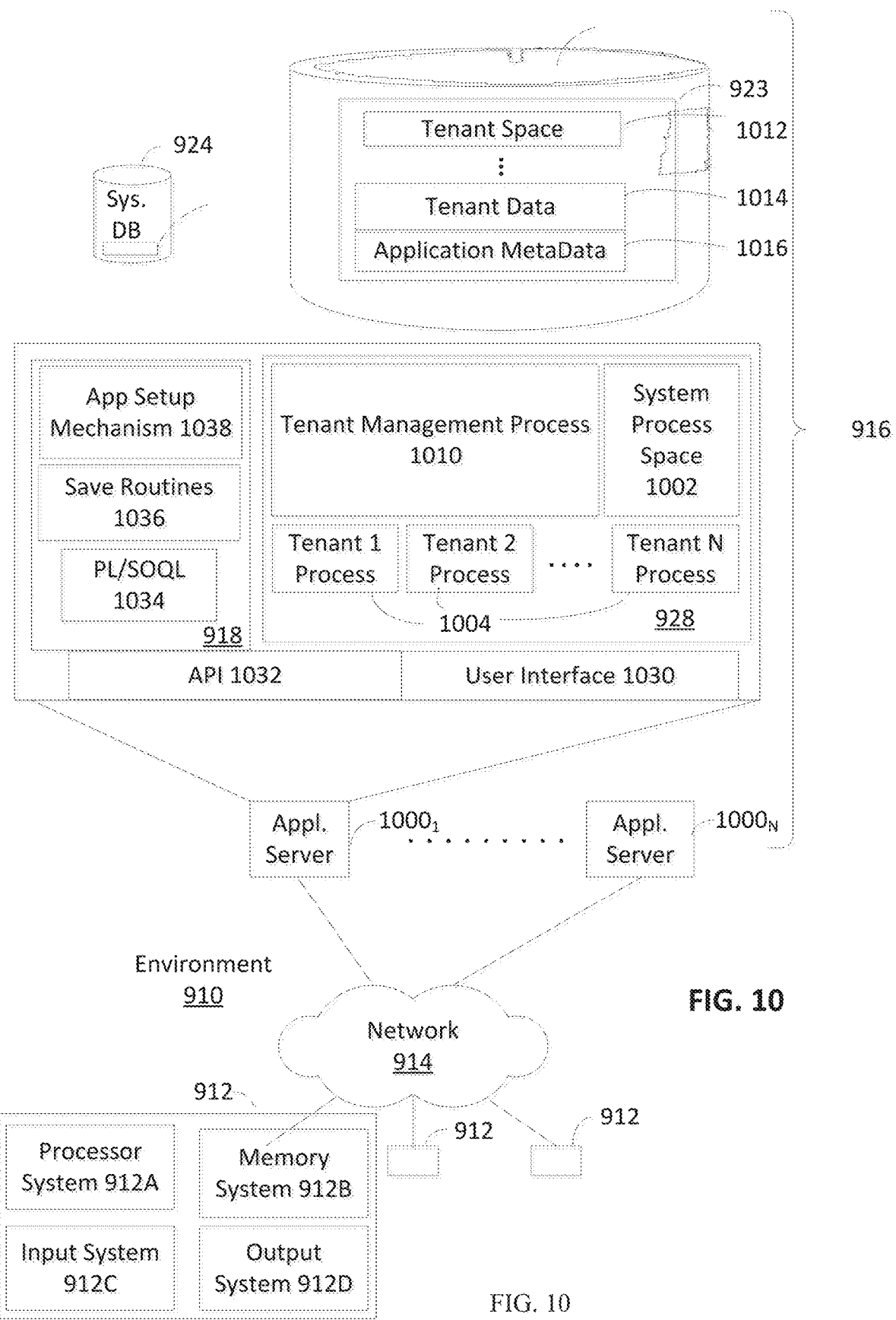
FIG. 10 shows a system diagram further illustrating the architecture of a multi-tenant database environment, in accordance with some embodiments.

FIG. 9 shows a block diagram of an environment 910 wherein an on-demand database service might be used, in accordance with some embodiments. Environment 910 includes an on-demand database service 916. User system 912 may be any machine or system that is used by a user to access a database user system. For example, any of user systems 912 can be a handheld computing system, a mobile phone, a laptop computer, a work station, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some embodiments, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 916, shown in FIG. 9, implements a web-based customer relationship management (CRM) system. For example, in some embodiments, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some embodiments. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 4007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some embodiments, therefore, an interface system implementing a load balancing function (e.g., an F5 Big-IP load balancer) is communicably coupled between the application servers 1000 and the user systems 912 to distribute requests to the application servers 1000. In some embodiments, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

The invention claimed is:

1. A method comprising:
   determining, by a database system, a maximum number of nodes for a first hierarchical data structure based on performance metrics measured from a plurality of performance tests performed on at least a second hierarchical data structure, the maximum number of nodes being independent of a width and a height of the first hierarchical data structure;
   generating, by the database system, the first hierarchical data structure comprised of a plurality of nodes, each node representing a record;
   determining, by the database system, if a number of nodes in the first hierarchical data structure exceeds the predetermined maximum number of nodes;
   generating, by the database system, a notification in response to a determination that the number of nodes in the hierarchical data structure exceeds the predetermined maximum number of nodes.

2. The method of claim 1, further comprising:
   receiving, by the database system, an update to at least one of the plurality of nodes of the first hierarchical data structure;
   identifying, by the database system, the number of nodes of the plurality of nodes within the first hierarchical data structure that need to be updated in response to the received update;
   updating, by the database system, the identified nodes of the first hierarchical data structure with the received update.

3. The method of claim 1, further comprising:
   receiving, by the database system, a request to perform an operation on the generated first hierarchical data structure;
   denying, by the database system, the request to perform the operation when the number of nodes in the first hierarchical data structure exceeds the maximum number of nodes.

4. The method of claim 3, wherein the operation is at least one of updating the first hierarchical data structure, querying the first hierarchical data structure and mining the first hierarchical data structure.

5. The method of claim 1, further comprising:
   receiving, by the database system, a request to add at least one new node to the first hierarchical data structure;
   updating, by the database system, the first hierarchical data structure to add the at least one new node;
   monitoring, by the database system, the updating of the first hierarchical data structure to determine if the updated number of nodes in the first hierarchical data structure exceeds the maximum number of nodes;
   generating, by the database system, a notification in response to a determination that the updated number of nodes in the first hierarchical data structure exceeds the maximum number of nodes.

6. The method of claim 2, further comprising:
   synchronously updating, by the database system, the identified nodes of the first hierarchical data structure when the number of nodes is at least one of less than and equal to the maximum number of nodes; and
   asynchronously updating, by the database system, the identified nodes of the first hierarchal data structure when the number of nodes is greater than the maximum number of nodes.

7. The method of claim 5, further comprising:
   synchronously updating, by the database system, the first hierarchal data structure when the updated number of nodes is at least one of less than and equal to the maximum number of nodes; and
   asynchronously updating, by the database system, the first hierarchal data structure when the updated number of nodes is greater than the maximum number value.

8. A system comprising:
   one or more processors; and
   a non-transitory computer readable medium storing a plurality of instructions, which when executed, causes the one or more processors to:
   determine a maximum number of nodes for a first hierarchical data structure based on performance metrics measured from a plurality of performance tests performed on at least a second hierarchical data structure, the maximum number of nodes being independent of a width and a height of the first hierarchical data structure;
   generate the first hierarchical data structure comprised of a plurality of nodes, each node representing a record;
   determine if a number of nodes in the first hierarchical data structure exceeds the predetermined maximum number of nodes;
   generate a notification in response to a determination that the number of nodes in the hierarchical data structure exceeds the predetermined maximum number of nodes.

9. The system of claim 8, wherein the plurality of instructions, when executed, further cause the one or more processors to:
receive an update to at least one of the plurality of nodes of the first hierarchical data structure;
identify the number of nodes of the plurality of nodes within the first hierarchical data structure that need to be updated in response to the received update;
update the identified nodes of the first hierarchical data structure with the received update.

10. The system of claim 8, wherein the plurality of instructions, when executed, further cause the one or more processors to:
receive a request to perform an operation on the generated first hierarchical data structure;
deny the request to perform the operation when the number of nodes in the first hierarchical data structure exceeds the maximum number of nodes.

11. The system of claim 10, wherein the operation is at least one of updating the first hierarchical data structure, querying the first hierarchical data structure and mining the first hierarchical data structure.

12. The system of claim 8, wherein the plurality of instructions, when executed, further cause the one or more processors to:
receive a request to add at least one new node to the first hierarchical data structure;
update the hierarchical data structure to add the at least one new node;
monitoring the updating of the first hierarchical data structure to determine if the updated number of nodes in the first hierarchical data structure exceeds the maximum number of nodes;
generate a notification in response to a determination that the updated number of nodes in the first hierarchical data structure exceeds the maximum number of nodes.

13. The system of claim 9, wherein the plurality of instructions, when executed, further cause the one or more processors to:
synchronously update the identified nodes of first hierarchical data structure when the number of nodes is at least one of less than and equal to the maximum number of nodes; and
asynchronously update the identified nodes of the first hierarchal data structure when the number of nodes is greater than the maximum number of nodes.

14. The system of claim 12, wherein the plurality of instructions, when executed, further cause the one or more processors to:
synchronously update the first hierarchal data structure when the updated number of nodes is at least one of less than and equal to the maximum number of nodes; and
asynchronously update the first hierarchal data structure when the updated number of nodes is greater than the maximum number value.

15. A computer program product comprising a non-transitory computer readable medium having computer-readable program code instructions stored thereon, the instructions being executed by one or more processors, the program code including instructions to:
determine a maximum number of nodes for a first hierarchical data structure based on performance metrics measured from a plurality of performance tests performed on at least a second hierarchical data structure, the maximum number of nodes being independent of a width and a height of the first hierarchical data structure;
generate the first hierarchical data structure comprised of a plurality of nodes, each node representing a record;
determine if a number of nodes in the first hierarchical data structure exceeds the predetermined maximum number of nodes;
generate a notification in response to a determination that the number of nodes in the hierarchical data structure exceeds the predetermined maximum number of nodes.

16. The computer program product of claim 15, wherein the program code includes further instructions to:
receive an update to at least one of the plurality of nodes of the first hierarchical data structure;
identify the number of nodes of the plurality of nodes within the first hierarchical data structure that need to be updated in response to the received update;
update the identified nodes of the first hierarchical data structure with the received update.

17. The computer program product of claim 15, wherein the program code includes further instructions to:
receive a request to perform an operation on the generated first hierarchical data structure;
deny the request to perform the operation when the number of nodes in the first hierarchical data structure exceeds the maximum number of nodes.

18. The computer program product of claim 17, wherein the operation is at least one of updating the first hierarchical data structure, querying the first hierarchical data structure and mining the first hierarchical data structure.

19. The computer program product of claim 15, wherein the program code includes further instructions to:
receive a request to add at least one new node to the first hierarchical data structure;
update the first hierarchical data structure to add the at least one new node;
monitoring the updating of the first hierarchical data structure to determine if the updated number of nodes in the first hierarchical data structure exceeds the maximum number of nodes;
generate a notification in response to a determination that the updated number of nodes in the first hierarchical data structure exceeds the maximum number of nodes.

20. The computer program product of claim 16, wherein the program code includes further instructions to:
synchronously update the identified nodes of the first hierarchical data structure when the number of nodes is at least one of less than and equal to the maximum number of nodes; and
asynchronously update the identified nodes of the first hierarchal data structure when the number of nodes is greater than the maximum number of nodes.

21. The computer program product of claim 19, wherein the program code includes further instructions to:
synchronously update the first hierarchal data structure when the updated number of nodes is at least one of less than and equal to the maximum number of nodes; and
asynchronously update the first hierarchal data structure when the updated number of nodes is greater than the maximum number value.

* * * * *